US008527660B2

(12) United States Patent
Prasad et al.

(10) Patent No.: US 8,527,660 B2
(45) Date of Patent: Sep. 3, 2013

(54) DATA SYNCHRONIZATION BY COMMUNICATION OF MODIFICATIONS

(75) Inventors: Srikiran Prasad, Santa Clara, CA (US); Rik Sagar, Santa Clara, CA (US); Frank Judge, Haverhill, MA (US); Gurmeet Singh Kalra, Newark, CA (US)

(73) Assignee: Palm, Inc., Sunnyvale, CA (US)

( * ) Notice: Subject to any disclaimer, the term of this patent is extended or adjusted under 35 U.S.C. 154(b) by 556 days.

(21) Appl. No.: 11/615,671

(22) Filed: Dec. 22, 2006

(65) Prior Publication Data

US 2008/0155058 A1 Jun. 26, 2008

(51) Int. Cl.
*G06F 15/16* (2006.01)
(52) U.S. Cl.
USPC ........... 709/248; 709/217; 709/218; 709/219; 709/246
(58) Field of Classification Search
USPC .................................. 709/217–219, 246, 248
See application file for complete search history.

(56) References Cited

U.S. PATENT DOCUMENTS

| 6,148,340 | A  | * | 11/2000 | Bittinger et al. | 709/224 |
|---|---|---|---|---|---|
| 2002/0010807 | A1 | * | 1/2002 | Multer et al. | 709/328 |
| 2002/0083265 | A1 | * | 6/2002 | Brough et al. | 711/118 |
| 2002/0174180 | A1 | * | 11/2002 | Brown et al. | 709/203 |
| 2002/0194207 | A1 | * | 12/2002 | Bartlett et al. | 707/203 |
| 2004/0034849 | A1 | * | 2/2004 | Cohen et al. | 717/120 |
| 2005/0114711 | A1 | * | 5/2005 | Hesselink et al. | 713/201 |
| 2005/0132382 | A1 | * | 6/2005 | McGuire et al. | 719/311 |
| 2005/0223047 | A1 | * | 10/2005 | Shah et al. | 707/201 |
| 2005/0223117 | A1 | * | 10/2005 | Terry et al. | 709/248 |
| 2005/0256907 | A1 | * | 11/2005 | Novik et al. | 707/200 |
| 2006/0190572 | A1 | * | 8/2006 | Novik et al. | 709/220 |
| 2007/0067349 | A1 | * | 3/2007 | Jhaveri et al. | 707/200 |

* cited by examiner

*Primary Examiner* — Chau Le

(57) ABSTRACT

A system enables data synchronization for data files shared between or among multiple devices. When a shared data file is modified on one of the computing devices, metadata describing or otherwise enabling recreation of that modification are generated. To enable synchronization of the shared data file, the metadata—rather than the modified shared data file—are transmitted to other devices. These other systems can then use the metadata to recreate the modification of the shared data file and thus achieve data synchronization without requiring retransmission of the shared data file after each modification thereto.

17 Claims, 4 Drawing Sheets

DATA SYNCHRONIZATION BY COMMUNICATION OF MODIFICATIONS

BACKGROUND

The present invention relates to data synchronization, and more specifically, to synchronizing data between or among multiple devices by communicating modifications made to the data instead of communicating the modified data.

Handheld devices and portable computers are becoming increasingly more powerful and functional devices. Many handheld devices are now multifunction devices with multiple device roles including: personal digital assistant (PDA), cellular phone, portable media player, voice recorder, video recorder, global positioning system (GPS), camera, and electronic file storage. Similarly, portable computers now have increased functionality and mobility. Because of these improvements in handheld devices and portable computers, these devices are increasingly used to access and modify data from multiple locations.

Additionally, advances in wireless Internet coverage and in wireless network capabilities made a broad range of data (such as electronic files, image files, audio files and video files) accessible to mobile communication devices, laptop computers, and other types of portable communication systems. Network improvements have also allowed electronic data to be accessed and modified from virtually any location. This combination of improved wireless network access and improved portable device functionality has caused users increasingly to access and modify electronic data from multiple, often widely separated, locations.

Because multiple users can access and modify the same data, the different data modifications should be synchronized to ensure the each user accesses the most recent version of the data. For example, a first user may edit an electronic document in one location, and a second user later accesses the same electronic document from a different location. Synchronization ensures that the electronic document accessed by the second user includes the modifications made by the first user. Synchronization is also used where a single user can access and modify the same data from multiple devices, requiring the data to be synchronized among the multiple devices.

Existing methods for data synchronization require the modified data, in its entirety, to be transmitted from one device to another or to a remote server. Significant network resources can be required to transmit the altered data, especially when large data files are modified. In areas with poor network connectivity or limited network access, transmission of the modified data can substantially degrade network performance and reduce the network resources available for user actions.

Therefore, there is a need for a method for synchronizing data among devices that reduces the network resources used in traditional systems for data synchronization.

SUMMARY

Using various embodiments of the invention, data are synchronized between or among multiple devices by communicating the modifications made to the data instead of communicating the modified data itself. In one embodiment, the modifications made to data on one device are expressed in metadata. The metadata may comprise, for example, a set of instructions that specify modifications that can be made to recreate the modified data on another device. When synchronization is to be achieved on another device, the data on the other device are then modified using the metadata, thereby enabling the modified data to be synchronized in the other devices without transmitting the modified data to those devices.

In one embodiment, when a shared data file is modified at a local device, metadata describing the modification of the shared data file are generated. The generated metadata are useable by the other device to recreate the modification of the shared data file. The generated metadata can then be transmitted to another device, which is configured to recreate the modification to synchronize the data file. In an embodiment, the metadata comprise textual commands for use by an application to recreate the modification of the shared data file. To synchronize the shared data file on the remote device, the remote device uses the received metadata to modify a stored shared data file on the remote device. The metadata allow the remote device to recreate the modification of the shared data file by the local device. This conserves network resources by transmitting only metadata describing changes to the shared data file rather than transmitting the modified shared data file in its entirety.

In one embodiment, the size of the metadata and the size of the modified data are compared, with the smaller being transmitted. This further conserves network resources by transmitting the least amount of information that still permits data synchronization between multiple devices.

BRIEF DESCRIPTION OF THE DRAWINGS

The disclosed embodiments have other advantages and features, which will be more readily apparent from the following detailed description and the appended claims, when taken in conjunction with the accompanying drawings, in which:

DETAILED DESCRIPTION

Embodiments of the invention allow shared data stored on multiple devices to be synchronized between or among the devices. When the shared data are modified on one device, for example, metadata are generated to represent the modifications. The metadata are transmitted to one or more other devices, which can use the metadata to update their locally stored data according the modifications represented in the metadata and thereby synchronize the shared data that was modified on one device. Rather than transmitting the modified data in its entirety, only the metadata describing the changes need to be transmitted. The metadata may describe the actual changes to the data or may describe how to make the changes. Because the metadata are typically smaller than the data, transmitting metadata may reduce the network resources necessary to synchronize shared data stored on multiple devices.

System Architecture

Figure 1:
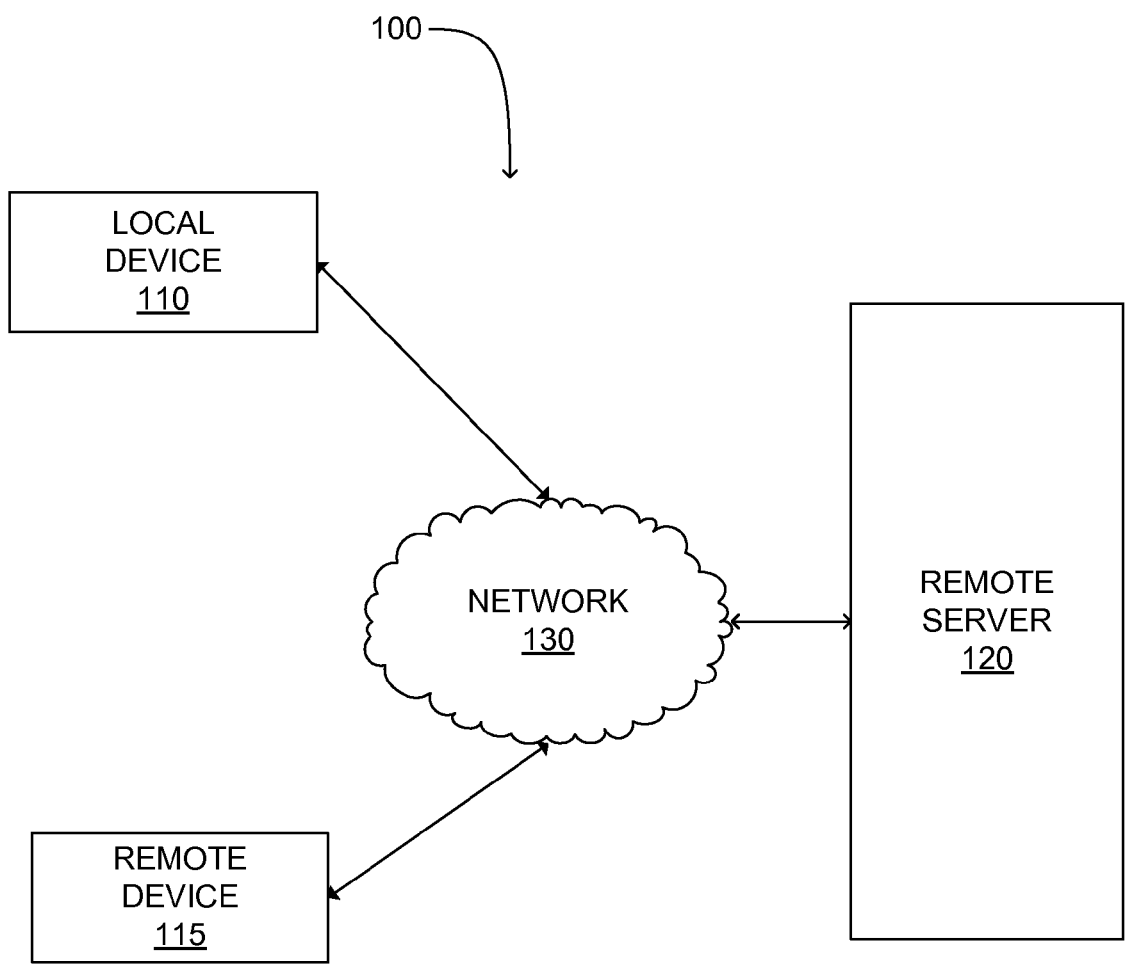
FIG. 1 is a block diagram of an architecture of the system, according to one embodiment of the invention.

FIG. 1 illustrates one embodiment of a system 100 for synchronizing data between devices. The system 100 comprises a local device 110, a remote device 115, and a network 130. In an embodiment, the system 100 further comprises a remote server 120. Network 130 allows local device 110 and remote device 115 to communicate with each other. In one embodiment, the remote server 120 is used to allow local device 110 and remote device 115 to communicate with each other.

Local device 110 and remote device 115 may each include computing capabilities and data communication capabilities. For example, local device 110 and remote device 115 may be a tablet computer, a laptop computer, a portable digital assistant (PDA), a smartphone, or any device able to transmit and receive data and perform actions on data. In one embodiment, local device 110 or remote device 115 comprises a desktop computer with data communication capabilities. In another embodiment, local device 110 or remote device 115 comprises a mobile communication device that is structured to fit, and be controlled from, the palm of a hand while providing computing capabilities with wireless communication capabilities. Further embodiments of device 110 and/or device 115 are described in more detail below.

Further, local device 110 and remote device 115 each include data storage capabilities for storing data shared between local device 110 and remote device 115. The shared data may comprise one or more data files, which may comprise electronic documents, graphical images, audio files, video files, e-mails, and/or any other electronic representations of information. When data are shared, both the local device 110 and remote device 115 store local copies of the shared data. Because the shared data are stored on multiple devices, the shared data stored on each device need to be synchronized so each device has a current version of the shared data.

The remote server 120 contains information that can be used to identify and access local device 110, remote device 115 and other devices connected to the network 130, such as Internet protocol (IP) addresses, or similar network addresses. The remote server 120 stores information, or data, accessible to device 110 and device 115. In an embodiment, the remote server 120 also stores metadata describing modifications to the stored data. Alternatively, the remote server 120 uses received metadata to update locally stored data without storing the received metadata. In other embodiments, the remote server 120 stores metadata local device 110 and remote device 115 access to determine how to locally modify data. In one embodiment, the remote server 120 stores the shared data and metadata in a central location that the local device 110 and the remote device 115 use to access the shared data and metadata. Alternatively, other synchronization configurations are possible. For example, local device 110 and remote device 115 may communicate directly with each other and access information locally stored on each device in a peer-to-peer configuration.

The network 130 is used to transmit information between device 110, device 115 and other devices. In one embodiment, the network 130 enables device 110, device 115 and the remote server 120 to communicate with each other. The network 130 may comprise a conventional wireless data communication system, for example, general packet radio service (GPRS), IEEE 802.11 (or WiFi), IEEE 802.16 (or WiMax), or any other suitable wireless communication system. Alternatively, the network 130 may comprise a conventional wired data communication system, such as Ethernet, digital subscriber line (DSL), integrated services digital network (ISDN), or any other suitable wired communication system.

Figure 2:
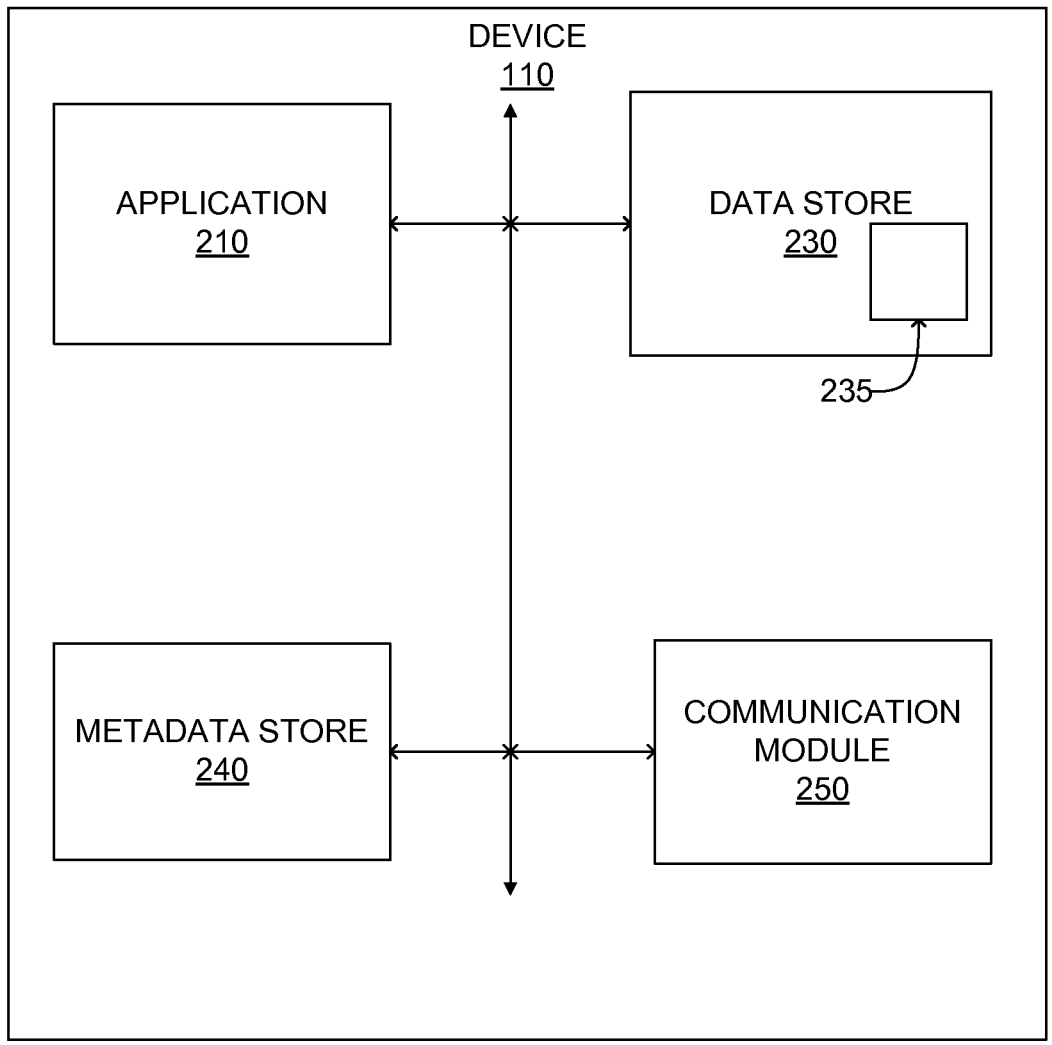
FIG. 2 is a high-level block diagram of a device, according to one embodiment of the invention.

FIG. 2 is a block diagram illustrating components of the local device 110 according to an embodiment. The remote device 115 and remote server 120 may be implemented with the same or a similar structure. Those of skill in the art will recognize that other embodiments can include different and/or additional features and/or components than the ones described here.

Local device 110 comprises an application 210, a metadata store 240, a data store 230 and a communication module 250. In an embodiment, the metadata store 240 is not present because the local device 110 may transmit metadata describing file modifications whenever a change is made, and therefore the local device 110 need not store this type of metadata. The application 210 allows a user to access and modify a data file on the device 110. Local device 110 may also include a visual display device, such as a liquid crystal display or cathode ray tube display, allowing the application 210 to present information to the user. Further, local device 110 may include an input device, such as a keyboard, a digitizer pad, a "touch" sensitive display (e.g., pressure-sensitive (resistive), electrically-sensitive (capacitance), acoustically-sensitive (SAW, or surface acoustic wave), or photo-sensitive (infra-red)) that allows the application 210 to receive input from the user.

The communication module 250 enables the local device 110 to communicate with network 130 and other remote devices 115 or remote servers 120. In an embodiment, the communication module 250 comprises a transceiver such as for infrared communication, Bluetooth communication, 3G communication, radio frequency communication, or any other wireless communication technique. In an alternative embodiment, the communication module 250 comprises a conventional wired connection, such as Ethernet, USB, etc. or other wired communication technique. The communication module 250 allows data files and/or information to be distributed using network protocols, such as Transmission Control Protocol (TCP), Internet Protocol (IP), Hypertext Transmission Protocol (HTTP), or other protocols capable of communicating data or information.

The application 210 allows a user to access and modify data files that are stored in the data store 230. Alternatively, the application 210 may use and modify data files without any direct user input. The application 210 may present information to the user and receive input from a user. In an embodiment, the application 210 may also access and modify data in response to input from the metadata store 240. Alternatively, the application 210 may generate metadata, for storage or transmission, describing the contents of the data store 230 accessed or modified by a user. Typically, the device 110 will contain a number of different applications 210 that each perform different functions (such as word processors, email clients, and various types of computer software for viewing and manipulating media), but for simplicity, an embodiment with a single application 210 is described herein.

The metadata store 240 stores metadata, or other information, that describes changes made to the data files by the application 210. The metadata store 240 can be a hard disk drive, a flash memory device, or any other suitable mass storage device. Further, the metadata store 240 can be a volatile storage device, a non-volatile storage device, or a combination of a volatile storage device and a non-volatile storage device. In an embodiment, the device 110 does not include a metadata store 240, but transmits metadata describing data modifications to remote device 115 or remote server 120 when the metadata is generated using the communication module 250.

The data store 230 stores data for use by the local device 110. The stored data can be received from the remote device 115 or the remote server 120, or the stored data can be locally generated by a user of device 110. The data store 230 can be a hard disk drive, a flash memory device, or some other mass storage device known in the art. Further, the data store 230 can be a volatile storage device, a non-volatile storage device, or a combination of a non-volatile storage device and a volatile storage device.

The data store 230 may include a shared data file 235 corresponding to data stored on local device 110 and a remote device 115 or a remote server 120. Each device 115 that uses the shared file 235 locally stores a copy of the shared file 235 on the device 115. The shared file 235 may comprise textual data, graphical data, video data, audio data, multimedia content, or any other information capable of being represented electronically. When a user modifies the shared file 235 on the local device 110, the copy of the shared file 235 stored on remote devices 115 needs to be modified accordingly so the local device 110 and the remote device 115 access the same version of the shared file 235.

System Operation

Figure 3:
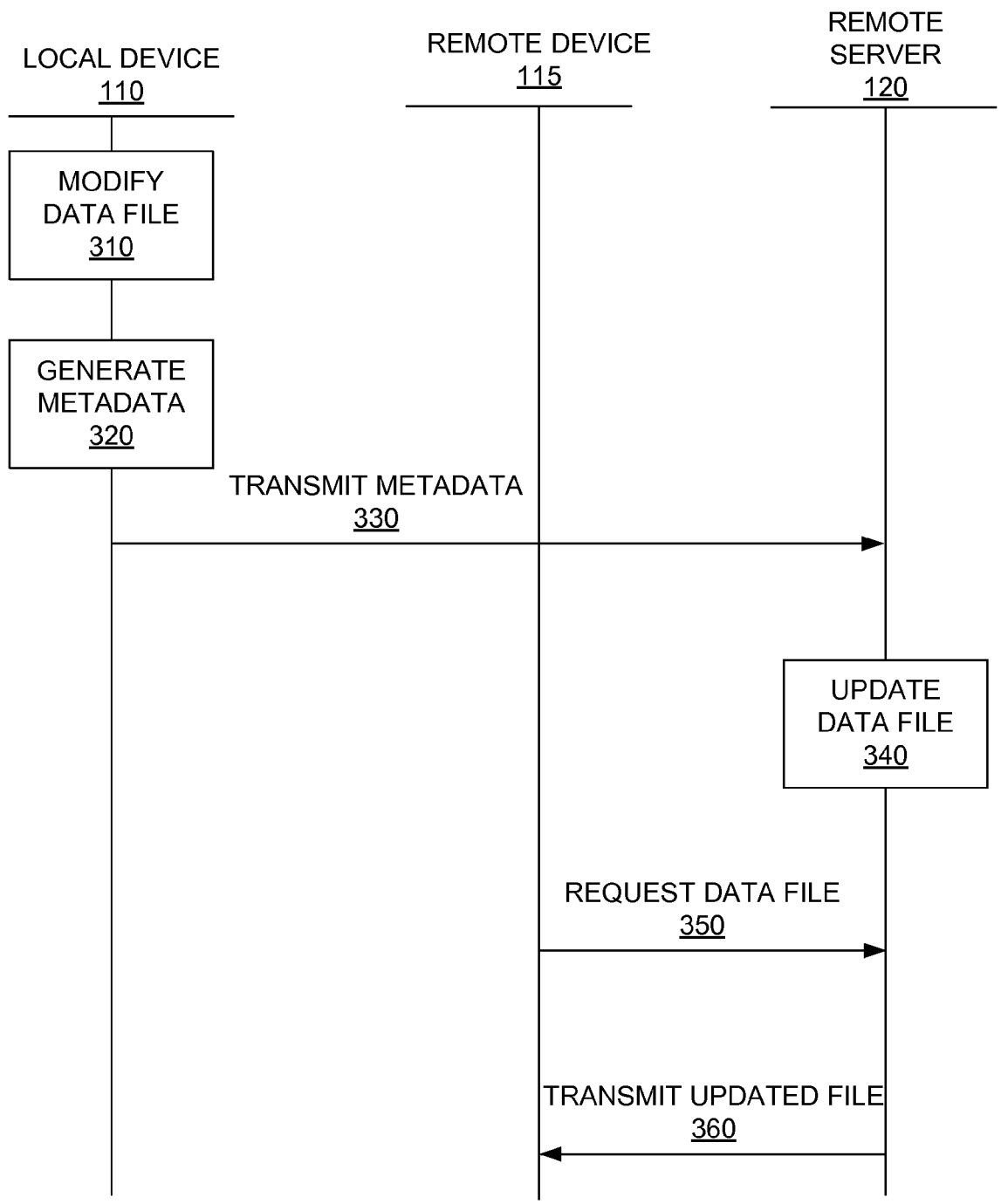
FIG. 3 is a trace diagram illustrating the synchronization of data between a local device and a remote device, according to one embodiment of the invention.

FIG. 3 is a trace diagram illustrating data synchronization between a local device 110 and a remote device 115 according to one embodiment. Those of skill in the art will recognize that other embodiments can perform the steps of FIG. 3 in different orders. Moreover, other embodiments can include different and/or additional steps than the ones described here.

Initially, the shared file 235, or other shared data, is modified 310 on the local device 110. In an embodiment, the data modification 310 is responsive to user actions. Alternatively, the data modification 310 may be responsive to actions performed by software running on the local device 110. Examples of data modification 310 include rotating an image, resizing an image, cropping an image, editing an electronic document, and a virtually unlimited variety of other actions that alter characteristics or contents of the shared file 235. Metadata describing the data modifications are then generated 320 on the local device. The generated 320 metadata identify the modified file and describe the data modifications or otherwise enable another device to recreate the modifications made to the data file 235.

In an embodiment, the metadata 210 comprise a description of the differences between the original shared file 235 and the modified shared file 235. For example, the metadata may describe the areas of an image file that have been altered or the sections of an electronic document that have been edited, as well as what modifications were made. In another embodiment, the metadata comprise instructions and arguments specifying how the shared file 235 should be updated. For example, the metadata can comprise an instruction to rotate an image file a specified amount or to remove a specified number of words from a portion of an electronic document, or any instruction the application 210 can use to modify data.

The generated metadata are then transmitted 330 to the remote server 120. Because the metadata describe the modifications to the shared file 235, the remote server 120 uses the metadata to update 340 the copy of the shared file 235 stored on the remote server 120. This causes the same modifications to be made to the copy of the shared file 235 on the local device 110 and the copy of the shared file 235 on the remote server 120, synchronizing the contents of the shared file 235 between devices.

In an embodiment, an application 210 on the remote server 120 performs operations on the shared file 235 corresponding to the contents of the metadata once the remote server 120 receives the metadata. Alternatively, the remote server 120 may store the metadata in a metadata store 240, which the application 210 running on the remote device 115 then accesses to alter the shared file 235. Transmitting 330 the metadata describing the modifications 310 conserves network resources by allowing the remote server 120 to locally modify the shared file 235 the remote server 120 rather than requiring transmission of the modified 310 shared file 235 to the remote server 120.

In an embodiment, the local device 110 compares the size of the metadata to the size of the shared file 235, and transmits 330 the smaller of the two to the remote server 120. In this way, the metadata is transmitted if it is not larger than the modified shared file 235 or the modified shared file 235 is transmitted if it is smaller than the metadata. This comparison may further conserve network resources by transmitting the smallest amount of information necessary to communicate changes in the shared file 235 to another device.

After the remote server 120 updates 340 the data file, and when the remote device 115 requests 350 the shared data file 235, the remote server 120 transmits 360 the updated shared file 235 to the remote device 115. Changing the copy of the shared file 235 on the remote server 120 allows the changes to the shared file 235 to be propagated to other devices, such as remote device 115, when they request 350 the shared file 235 from the remote server 120. This allows the remote server 120 to update 340 shared files 235 centrally, rather than requiring each of the individual remote devices 115 to modify locally stored copies of the shared file 235. Additionally, using the remote server 120 to update 340 shared files 235 may increase the type and extent of data modifications 310 possible by using the computing resources of the remote server 120, which are likely to exceed the computing resources of local device 110 or remote device 115.

In an alternative embodiment, the local device 110 transmits 330 the metadata describing the changes to the shared file 235 to the remote device 115. The remote device 115 then uses the metadata to update 340 a copy of the shared file 235 stored on the remote device. This allows each remote device 115 to synchronize the contents of the shared file 235 by locally modifying copies of the shared file 235. In this embodiment, the remote devices 115 also perform conflict resolution to determine the order in which to use the metadata to accurately update 340 the shared file 235. Conflict resolution allows the remote devices 115 to determine what changes to the local copy of the shared file 235 should be made first, or what changes to the local copy of the shared file 235 have priority over other changes. The remote devices 115 may implement various conflict resolution schemes, such as recording timestamps of changes made, assigning priority to changes from certain devices, or any other suitable conflict resolution scheme.

Figure 4:
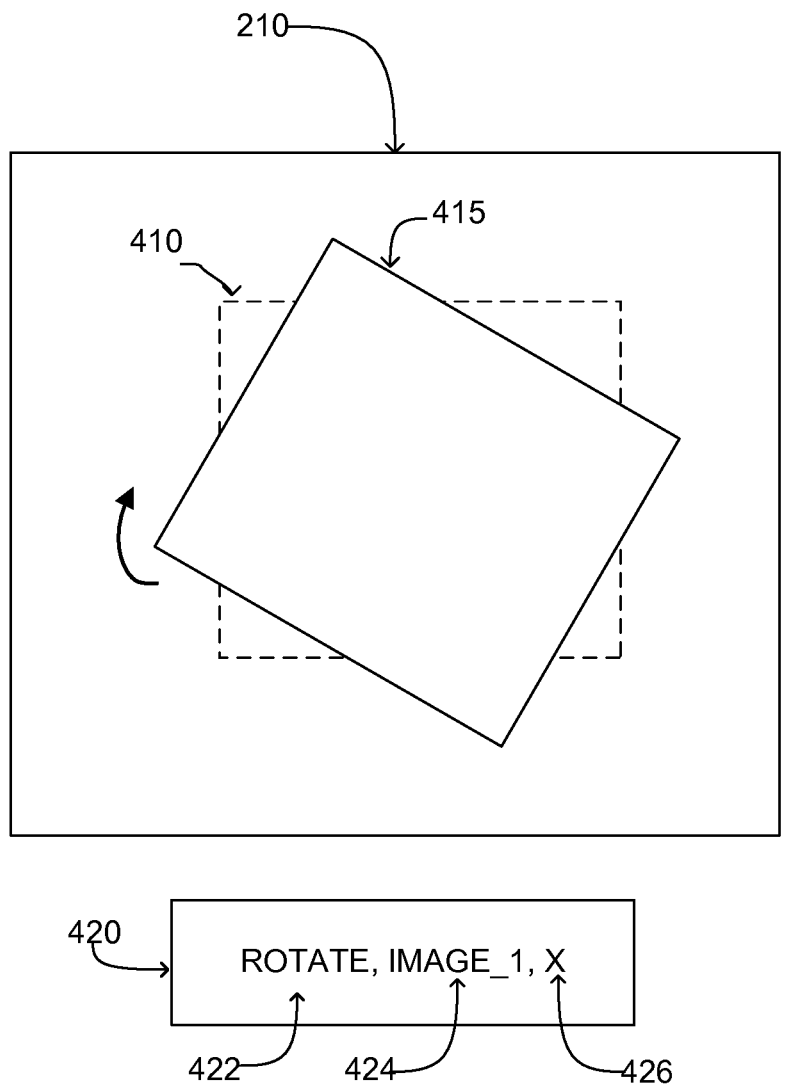
FIG. 4 is an example of metadata used to describe modifications to data, according to one embodiment of the invention.

FIG. 4 illustrates an example use of metadata to represent modifications made to a shared data file 325, according to an embodiment. In the example of FIG. 4, image files are stored on the local device 110. The application 210 allows a user to access and modify the stored image files.

Initially, image 410 is accessed by the application 210 and presented to the user. The original image 410 can then be changed by the user to produce modified image 415. For example, modified image 415 can comprise the original image 410 rotated by a specified amount. The application 210 can record and store the actions taken by the user to generate modified image 415 as metadata 420. For example, metadata 420 describes the user action 422, the name 424 of the original image 410, and an argument 426 modifying the user action 422. In the example of FIG. 4, metadata 420 indicates that the user has rotated image_1 by X degrees to create the modified image 415.

Because metadata 420 is a textual string, in one embodiment, transmission of metadata 420 requires less bandwidth on the network 130 than would transmission of the modified image 415 in its entirety. Upon receiving the metadata 420, an application 210 on the remote server 120 may modify the locally stored copy of the shared file 325 to reflect the alterations described by metadata 420. Thus, the metadata 420 enables an application 210 on the local device 110 and an application on the remote server 120 to perform the same modifications to copies of the shared file 325 stored on each device, synchronizing the shared file 325 copy on each device.

Alternatively, the local device 110 may transmit the metadata 420 to a remote device 115 (directly, or via the remote server 120), which modifies a local copy of the shared file 325 on the remote device based on the contents of the metadata. This allows remote devices 115 to synchronize locally stored copies of image 410 by each changing locally stored copies of image 410. Because the remote device 115 may receive metadata 420 from a plurality of other devices at different times, the remote device 115 may also determine the appropriate order in which to apply the received metadata to modify the image 410 accurately.

Summary

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system or similar electronic computing device, which manipulates and transforms data represented as physical (electronic) quantities within the computer system memories or registers or other such information storage, transmission, or display devices.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memory (ROM), random access memory (RAM), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium and modulated or otherwise encoded in a carrier wave transmitted according to any suitable transmission method.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, embodiments of the invention are not described with reference to any particular programming language. It is appreciated that a variety of programming languages may be used to implement various embodiments of the invention as described herein, and any references to specific languages are provided for disclosure of enablement and best mode of embodiments of the invention.

Finally, it should be noted that the language used in the specification has been principally selected for readability and instructional purposes, and it may not have been selected to delineate or circumscribe the inventive subject matter. Accordingly, the disclosure of the embodiments of the invention is intended to be illustrative, but not limiting, of the scope of the invention, which is set forth in the following claims.

What is claimed is:

1. A method for synchronizing image data between or among multiple devices, each device storing a common image as a shared data file, the method comprising:
  receiving user input performing an image editing operation by an image editing application on a local device to modify an image digitally recorded as a shared data file that is stored on the local device, a copy of the shared data file stored on each of a plurality of devices each configured to modify the shared data file;
  in response to said user editing of the image, generating metadata describing the operation performed by the application causing the modification of the shared data file;
  comparing a size of the metadata describing the modification of the shared data file to a size of the shared data file; and
  responsive to the size of the shared data file exceeding the size of the metadata describing the modification of the shared data file, transmitting the metadata to a remote device, the metadata usable by a corresponding application on the remote device with a conflict resolution scheme to perform a corresponding operation to recreate the modification of the shared data file on the remote device.

2. The method of claim 1, wherein the metadata comprise textual commands for use by the corresponding application to recreate the modification of the shared data file.

3. The method of claim 1, further comprising:
  storing the generated metadata on the local device.

4. The method of claim 3, wherein transmitting the metadata to a remote device comprises:
  receiving a request from the remote device for the stored metadata; and
  transmitting the metadata to the remote device in response to the received request.

5. The method of claim 1, wherein the remote device comprises a central server having a copy of the shared data file.

6. The method of claim 1, wherein generating metadata describing the modification of the shared data file comprises:

responsive to the operation performed by the application on the local device, generating metadata describing the modification of the shared data file.

7. The method of claim 1, further comprising:
responsive to the size of the metadata exceeding the size of the shared data file, transmitting the modified data file to the remote device.

8. A computer program product for synchronizing data between or among multiple devices, the computer program product comprising a computer readable storage device containing computer program code for:
performing an operation by an application on a local device to modify a shared data file on the local device, the shared data file accessible by a plurality of devices each configured to modify the shared data file;
in response to said modifying of the shared data file, generating metadata describing the operation performed by the application causing the modification of the shared data file;
comparing a size of the metadata describing the modification of the shared data file to a size of the shared data file; and
responsive to the size of the shared data file exceeding the size of the metadata describing the modification of the shared data file, transmitting the metadata to a remote device, the metadata usable by a corresponding application on the remote device with a conflict resolution scheme to perform a corresponding operation to recreate the modification of the shared data file on the remote device.

9. The computer program product of claim 8, further comprising:
receiving metadata from a second remote device, the metadata describing a second operation performed by a corresponding application on the second remote device causing a modification of the shared data file on the second remote device; and
performing a third operation corresponding to the second operation by the application on the local device to modify the shared data file on the local device according to the metadata to recreate the modification of the shared data file.

10. The computer program product of claim 8, wherein the metadata comprise textual commands for use by the corresponding application to recreate the modification of the shared data file.

11. The computer program product of claim 8, further comprising:
storing the generated metadata on the local device.

12. The computer program product of claim 11, wherein transmitting the metadata to a remote device comprises:

receiving a request from the remote device for the stored metadata; and
transmitting the metadata to the remote device in response to the received request.

13. The computer program product of claim 8, further comprising:
responsive to the size of the metadata exceeding the size of the shared data file, transmitting the modified data file to the remote device.

14. A local computerized device for operation on a communication network for synchronizing data between or among multiple devices, said local device having a computer program product for synchronizing data between or among multiple devices, the computer program product comprising a computer readable storage device containing computer program code for selectively:
performing an operation by an application on said local device to modify a shared data file on the local device;
generating metadata describing the operation performed by the application causing the modification of the shared data file;
comparing a size of the metadata describing the modification of the shared data file to a size of the shared data file;
responsive to the size of the shared data file exceeding the size of the metadata describing the modification of the shared data file, transmitting the metadata to a remote device; and
in response to receiving metadata from a remote device describing modification of the shared data filed made at the remote device, subject to a conflict resolution scheme, performing a corresponding operation to recreate, on the local device, the modification of the shared data file on the remote device.

15. The local device of claim 14, wherein said conflict resolution scheme comprises at least one of a timestamp associated with the modification of the shared data file and an assigned priority associated with the modification of the shared data file.

16. The local device of claim 14, wherein the metadata comprise textual commands for use by an application to recreate the modification of the shared data file.

17. The local device of claim 14, wherein the device further comprises:
a user input device for receiving an input for making a modification to a data stored on the device; and
said application to receive the input for making the modification to the data from the user input device, and to represent the modifications using metadata.

* * * * *